United States Patent [19]

Mueller

[11] 4,387,795

[45] Jun. 14, 1983

[54] INTER-AXLE TRANSMISSION APPARATUS

[76] Inventor: Otto Mueller, 13 Byfield La., Dearborn, Mich. 48120

[21] Appl. No.: 759,340

[22] Filed: Jan. 14, 1977

[51] Int. Cl.³ .............................................. F16H 37/06
[52] U.S. Cl. .................................. 192/60; 74/665 T; 192/56 F
[58] Field of Search .................. 192/60, 56 F; 64/26; 180/44 R, 44 E, 44 M, 24.09, 49, 242; 74/665 F, 665 T

[56] References Cited

U.S. PATENT DOCUMENTS

| | | | |
|---|---|---|---|
| 3,495,477 | 2/1970 | Mueller | 192/60 X |
| 3,577,803 | 5/1971 | Mueller | 192/60 X |
| 3,831,461 | 8/1974 | Mueller | 74/711 |
| 3,894,446 | 7/1975 | Snoy et al. | 74/711 |

FOREIGN PATENT DOCUMENTS

2640620  3/1977  Fed. Rep. of Germany .... 192/56 F

*Primary Examiner*—James F. Coan
*Attorney, Agent, or Firm*—Stephenson & Boller

[57] ABSTRACT

Apparatus selectively providing either two or four wheel drive for a motor vehicle wherein the ratio of torque transmitted to the front wheels when the four wheel drive is selected is preset and wherein limited slippage between the front and rear wheel drive is permitted, and remote control actuator means are provided for selectively shifting the apparatus between its two and four wheel drive positions.

10 Claims, 27 Drawing Figures

INTER-AXLE TRANSMISSION APPARATUS

BACKGROUND OF THE INVENTION

The present invention relates to improvements in interaxle transmissions for motor vehicles wherein the operators can select for use either two-wheel or four-wheel drives.

It is known to provide inter-axle transmissions which are constructed and arranged so that the operator of a vehicle having front and rear wheels can selectively use either a rear wheel drive or a front and rear wheel drive. It is also known to provide inter-axle transmissions wherein the ratio of torque transmitted to the front and rear wheel drives can be preset at a desired ratio and wherein desired limited slippage between the front and rear wheel drives can occur, as is disclosed, for example, in the U.S. Pat. No. 3,577,803, granted May 4, 1971, to Mueller. There is a need for an improved inter-axle transmission incorporating either or both of the foregoing concepts, and wherein the transmission can be shifted between its rear wheel drive position and its front and rear wheel drive position in a more effective manner than was heretofore possible with prior art structures. There is also a need to incorporate in such an improved transmission features that are taught in U.S. Pat. Nos. 3,393,582 and 3,393,583, granted July 23, 1968, and No. 3,831,461, granted Aug. 27, 1974, to Mueller.

SUMMARY OF THE INVENTION

The present invention has overcome inadequacies in inter-axle transmissions of the foregoing character, and provides improved features whereby an inter-axle transmission can be shifted between its two wheel and four wheel drives by a smooth, efficient, and silent operation. In a preferred form of the invention, the interaxle transmission includes a torque transmitting mechanism which is hydraulically operated to transmit torque to the front and rear wheel drives at a preset ratio of torque and which is responsive to undesirable winding of the drive system between the front and rear wheel drives to allow limited slippage to accommodate such winding. The preferred form of the invention also includes a hydraulically operated actuating means for shifting the inter-axle transmission between its two or four wheel drives, and the actuating means is constructed and arranged so that it can readily be operated from a remote location adjacent to the operator of the vehicle containing the transmission. The preferred form of the invention also includes a simple but effective selector lock for locking the actuating means in its two wheel drive position so that it cannot inadvertently shift to the four wheel drive position except when the actuating means is actuated by the operator of the vehicle.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The apparatus 10 is constructed and arranged for use in an inter-axle transmission 12 of a type which has a rotary input member 14 and a rotary output member 16. The rotary input member 14 may be a chain drive, as shown, which is connected to the rear wheel drive system of the motor vehicle, not shown, and the output member 14 can be a conventional coupling for connection to the front wheel drive system of the vehicle, not shown. The apparatus 10 includes a torque transmitting mechanism 18 which can be actuated to a first position of operation for transmitting substantially no torque from the input member 14 to the output member 16 and which can be actuated to a second position of operation for transmitting torque from the input member to the output member in a preselected member. The apparatus 10 also includes the actuator means 20 which is operably associated with the torque transmission mechanism 18 and is actuable to place the torque transmitting mechanism 18 selectively in either its first position or its second position of operation. Reference will be made to the drawings first for a description of the torque transmitting mechanism 18 after which the actuating means 20 will be described.

The torque transmitting mechanism 18 includes a first rotary element 22, a second rotary element 24, and hydraulic means 26 which has a hydraulic circuit, to be described, said hydraulic means 26 functioning to couple the rotary elements 22 and 24 together for co-rotation when the circuit is closed and allowing substantially free rotation of the second rotary element 24 relative to the first rotary element 22 when the circuit is fully open. In the first position of operation when the hydraulic circuit is partially or completely closed, the torque transmitting mechanism will function to completely or partially couple the front and rear wheel drive systems of the vehicle together to provide a four wheel drive, and when the hydraulic circuit of the hydraulic means 26 is fully open, the torque transmitting mechanism will allow torque to be transmitted only to the rear wheels so that a two wheel drive for the vehicle is provided.

The hydraulic means 26 includes the three equi-angular rise and fall cam surfaces 28, the pressure chambers or cylinders 30, the spring actuated pistons 32 positioned in each of the chambers 30, and the plurality of hydraulic fluid passageways within and between the two rotary elements 22 and 24 as well as the various valves associated with these passageways. As seen best in FIG. 4, the pressure chambers are in three sets, the first set being the pressure chambers 34, the second being the pressure chambers 36 and the third set being the pressure chambers 40; and the pistons 32 are similarly in three sets comprising the first set 42, the second set 44 and the third set 46. These pistons also have hollow interiors in which are located coil springs 48 for biasing the pistons against the cam surface 28 so that the pistons will reciprocate upon rotation of the first rotary element 22 with respect to the second rotary element 24. Thus, when such relative rotation occurs, the pistons will reciprocate to provide a pumping action within the pressure chambers for a purpose to be described. The hydraulic means 26 as described above includes features disclosed in aforesaid U.S. Pat. No. 3,393,582, to which reference is made for a more detailed description.

In its normal operating position, the hyraulic means 26 will be filled with a hydraulic fluid, and the pressure chambers 30 and the passageways to be described which form part of the hydraulic means 26 will also be completely filled with the hydraulic fluid. Under these circumstances, when the torque transmitting mechanism 18 is in its first position, as will subsequently be described, relative rotation between the first rotary element 22 and the second rotary element 24 will displace the hydraulic fluid from the pressure chambers 30. To permit such displacement to occur at a controlled rate, suitable passageways have been provided which will now be described.

Each set of the pressure chambers 30 has a passageway providing communication between its pressure chambers. Thus, pressure chambers 34 are in communication with one another by the passageway 50, the pressure chambers 36 are in communication with one another by the passageway 52, and the pressure chambers 38 are in communication with one another by the passageway 54.

Figures 2, 2A:
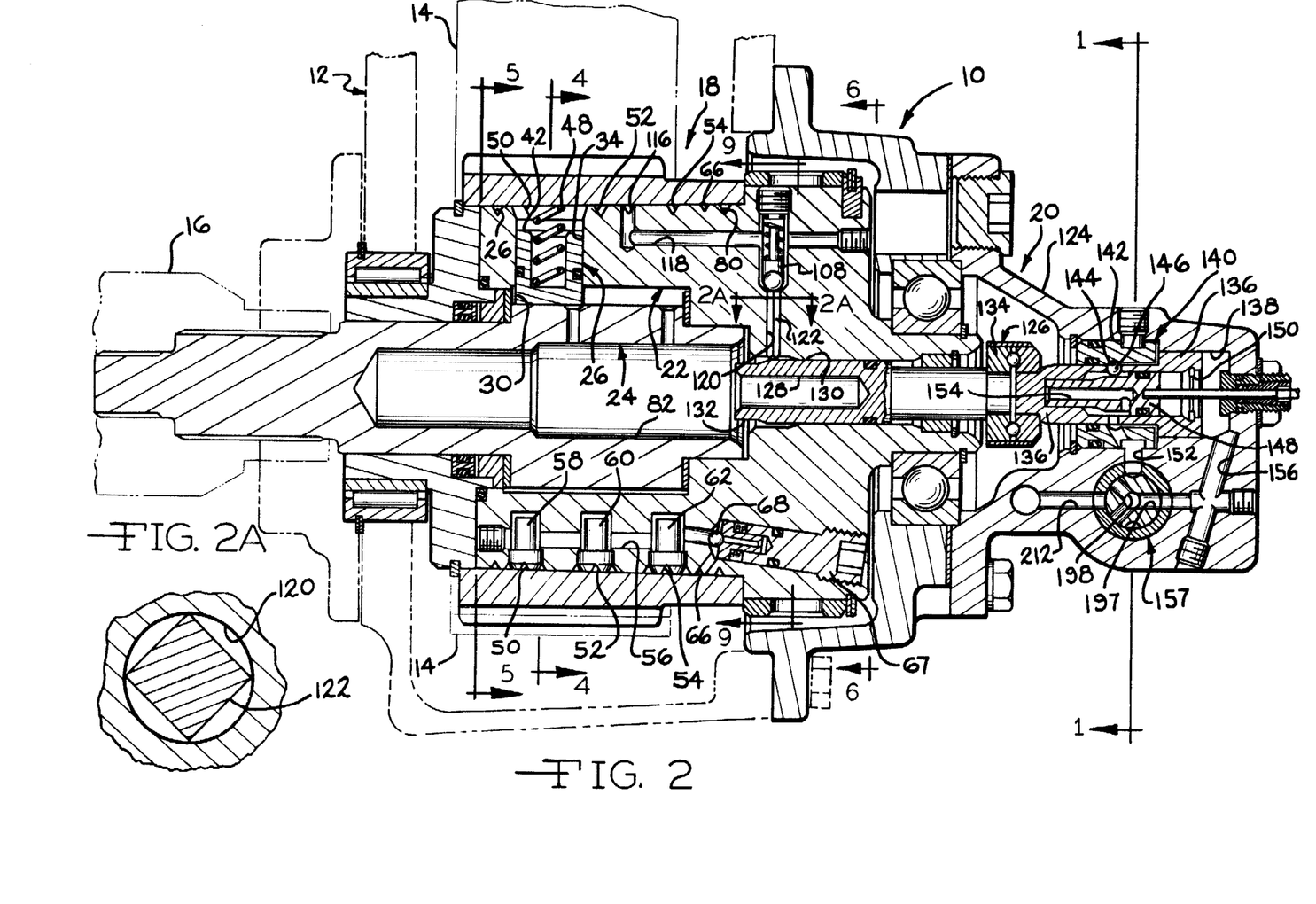
FIG. 2 is a longitudinal section of the apparatus taken on the lines 2—2 of FIG. 1, and showing in phantom lines portions of the inter-axle transmission.
FIG. 2A is an enlarged fragmentary section taken on the lines 2A—2A of FIG. 2.
Figure 11:
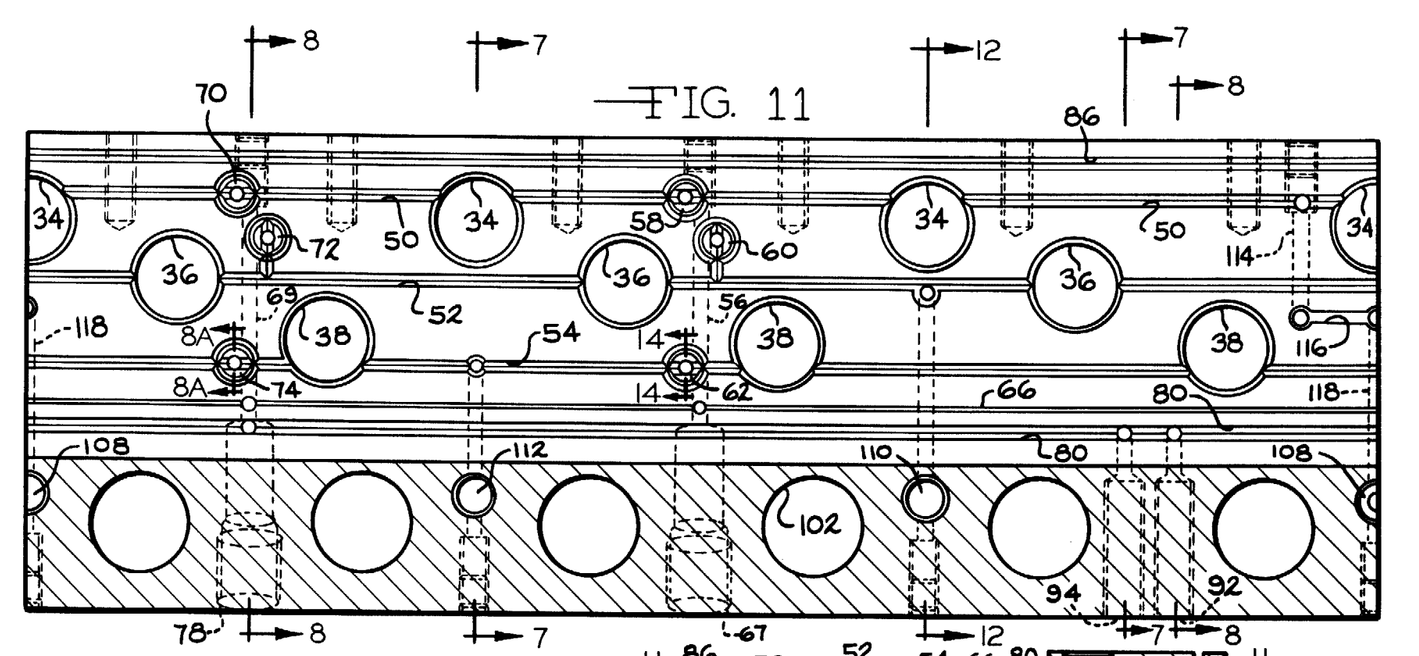
FIG. 11 is a developed view of the outer periphery of the portion of the torque transmitting mechanism shown in FIG. 5 and as viewed in the directions of the arrows 11—11 in FIG. 12.
Figure 12:
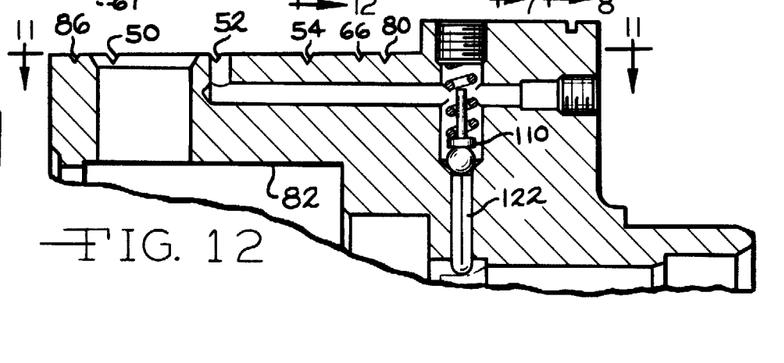
FIG. 12 is an enlarged fragmentary section of the portion of the torque transmission mechanism shown in FIG. 5 and taken on the lines 12—12 of FIG. 11.
Figure 13:
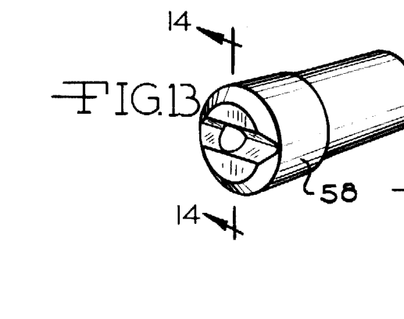
FIG. 13 is a perspective view of one of the check valves that form part of the pressure balancing system of the apparatus.
Figure 14:
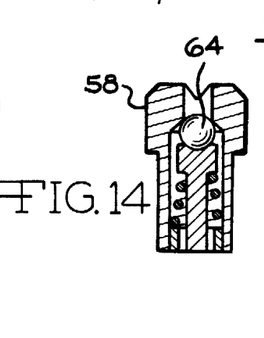
FIG. 14 is a sectional view of the check valve taken on the lines 14—14 of FIGS. 13.

To permit hydraulic fluid to be displaced from each set of pressure chambers and its associated annular passageway, a hydraulic discharge circuit is provided, and attention is directed to FIGS. 2 and 11 for a brief explanation of the discharge circuit. As there shown, a discharge passageway 56 provides communication between the discharge sides of the check valves 58, 60 and 62; and the inlet ends to each of these check valves are in communication respectively with the annular grooves 50, 52 and 54. Details of the check valves 58, 60 and 62 can be seen in FIGS. 13 and 14 from which it will be apparent that when the pressure on the upper side of the ball 64 exceeds the pressure on the under side thereof, the check valve will open to discharge hydraulic fluid under pressure to the passageway 56.

The passageway 56 can enter into communication with the annular restricted flow groove 66 via the initial torque control valve 67 which is in its normally closed position, such as is shown in FIG. 2. When the fluid pressure in the passageway 56 exceeds the spring pressure of the valve 67 to displace the ball 68 from its seat, fluid under pressure can flow from the passageway 56 to the restricted groove 66.

Figures 8, 8A:
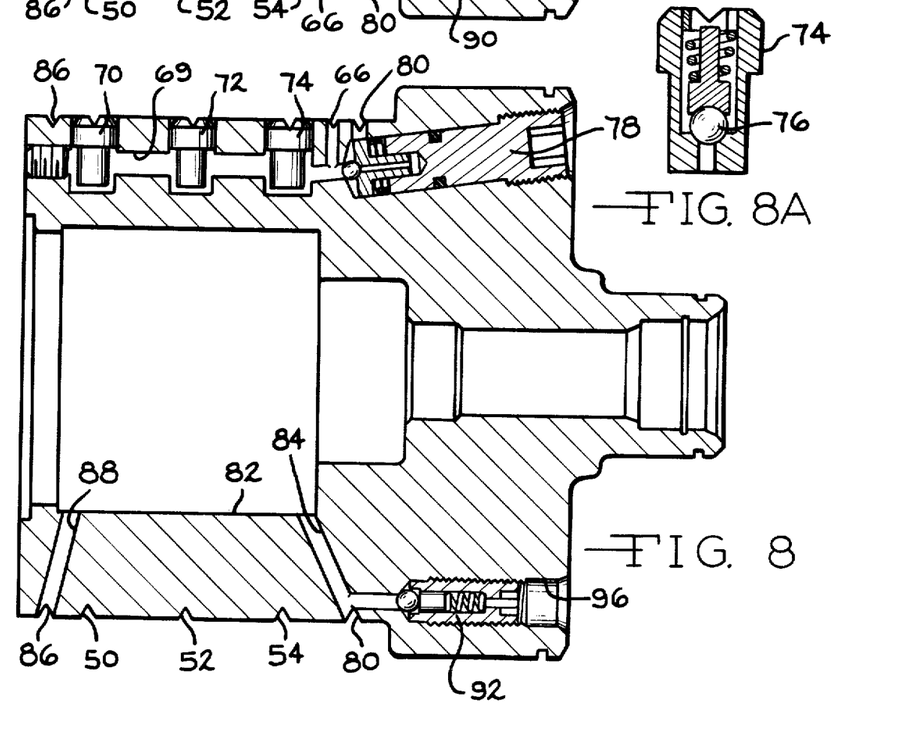
FIG. 8 is a sectional view taken on the lines 8—8 of FIG. 6.
FIG. 8A is a sectional view of check valves shown in FIG. 8, and taken on the lines 8A—8A of FIG. 11.

Also in communication with the annular groove 66 is the pressure chamber recharging passageway 69, FIG. 8, in which are located the check valves 70, 72, and 74. Details of construction of these valves can be seen in FIG. 8A where the valve 74 is illustrated in section. From this illustration it will be understood that when the pressure in the passageway 69 acts on the ball 76 to displace it from its seat, hydraulic fluid can flow past the check valve to the annular groove 54 and from there to the pressure chambers 38. By virtue of the construction and arrangement described with respect to the three check valves 58, 60 and 62, and the three check valves 70, 72 and 74, and their associated passageways and grooves, pressure between the three sets of pressure chambers will be constantly equalized, and the rate of flow that can occur will be governed by the setting initially made of the torque control valve 67. For a fuller discussion of this type of operation, reference is made to the aforesaid U.S. Pat. No. 3,577,803.

To provide protection against overload of the system, an overload protection valve 78 is provided which is in communication with the annular groove 66, as shown in FIG. 8, so that as a pressure above a pre-selected maximum occurs, the valve 78 will open to discharge to the annular groove 80 which is in communication with the reservoir 82, via the passageway 84. Thus, annular groove 82, annular groove 80 and the reservoir 82 will be filled with the hydraulic fluid at a relatively low pressure. An additional drainage groove 86 is also provided which is in communication with the reservoir 82 by means of the passageway 88.

For the purpose of initially supplying the hydraulic means 26 with hydraulic fluid, fittings 90 and 92 are provided. Fluid can be introduced through the port 94 and air can be vented from the port 96 by action of the fitting 92. It will be observed that the ports 94 and 96 are in communication with the annular groove 80 when the fittings are in their open positions.

Figures 6, 9, 10:
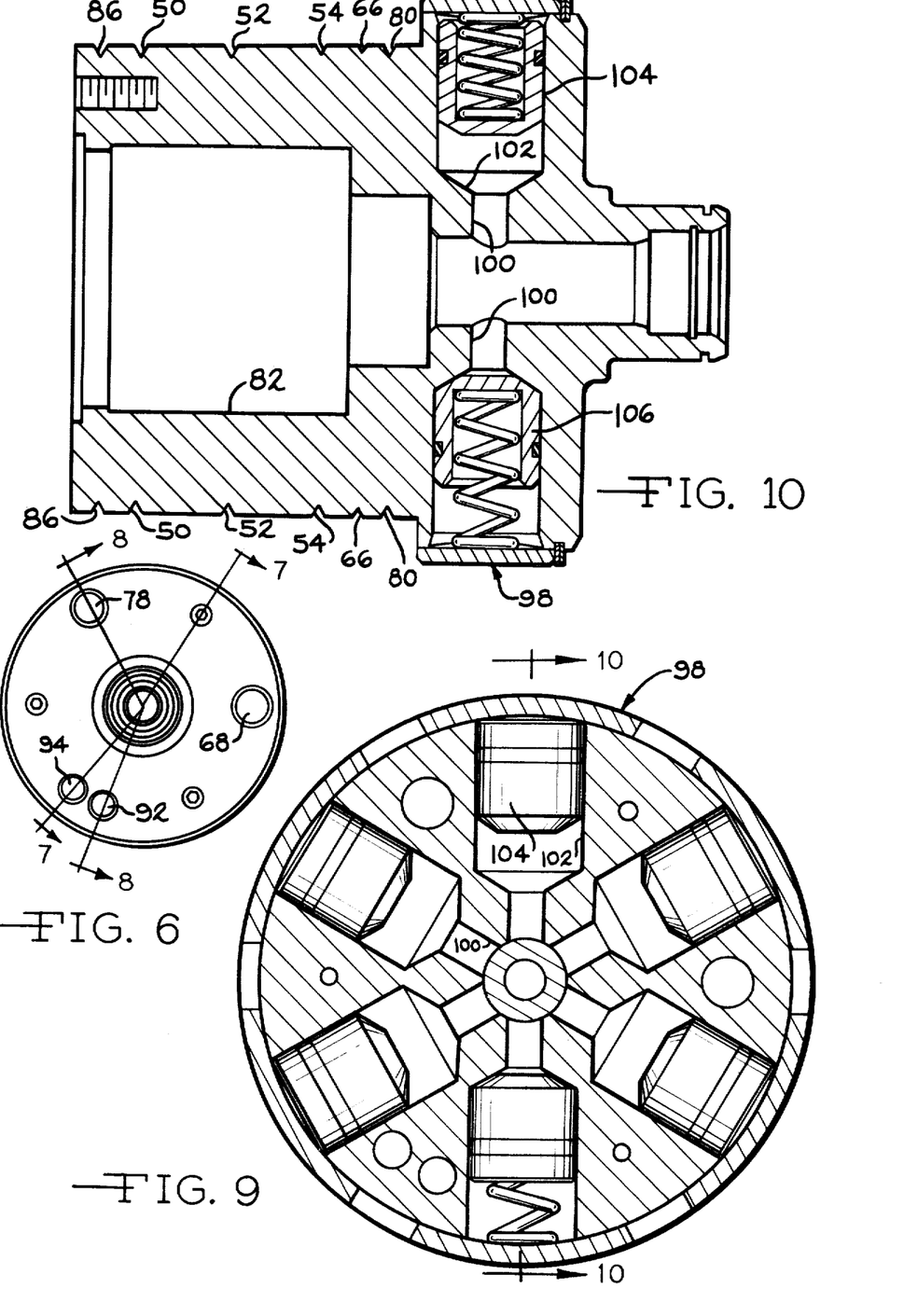
FIG. 6 is a similar end elevational view taken on the lines 6—6 of FIG. 2.
FIG. 9 is a vertical section taken on the lines 9—9 of FIG. 2.
FIG. 10 is a sectional view taken on the lines 10—10 of FIG. 9.
Figure 7:
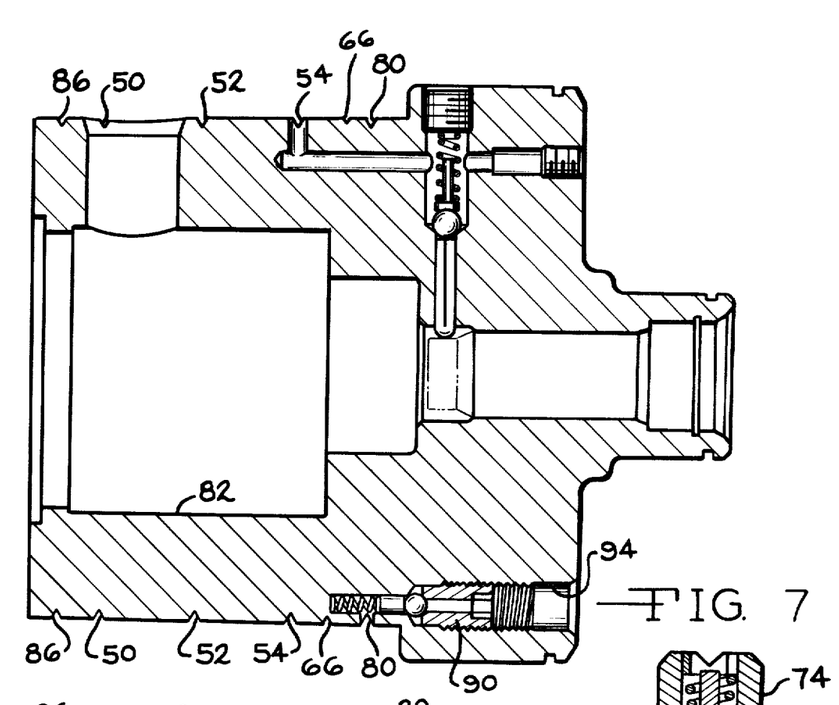
FIG. 7 is an enlarged sectional view taken on the lines 7—7 of FIG. 6.

As was previously described, the hydraulic means 26 includes the hydraulic reservoir 82 which is maintained filled with hydraulic fluid to the substantial exclusion of air. The advantages of this arrangement are particularly described in the aforesaid U.S. Pat. Nos. 3,393,583, and 3,831,461. To accommodate and to compensate for pressure changes of the fluid in the reservoir that may occur because of volumetric changes of the fluid, such as will occur by virtue of thermal changes of the fluid, a volumetric compensator means 98 is provided. As shown best in FIGS. 9 and 10, the volumetric compensator means 98 comprises a plurality of radially disposed passageways 100 which are in communication with the reservoir 82 and which in turn are also in communication with the cylinders 102. Located in the cylinders 102 are the pistons 104 which are spring biased to the position shown by the piston 106 in FIG. 10 but which can be urged radially outwardly against the spring pressure to the positions shown in FIG. 9. Thus, any significant pressure increase that occurs in reservoir 82 will readily be accommodated by the volumetric compensator means 98.

When the hydraulic means 26 is in its first position of operation as described above, relative turning of the first element 22 with respect to the second element 24 is governed by the rate that the pistons 42, 44 and 46 can displace hydraulic fluid through the closed circuit at the rate permitted by restricted groove 66 when the control valve 67 is opened. Under these conditions, the vehicle will be in a four wheel drive condition so that torque can be delivered at the preselected ratio from the rotary input member 14 to the rotary output member 16. To allow the torque transmitting mechanism 18 to be shifted to a second position in which the vehicle will be in a two wheel drive and wherein free wheeling can occur between the rotary members 14 and 16, and arrangement is provided wherein the hydraulic circuit of the hydraulic means 26 can be fully open to allow the pistons 42, 44 and 46 to reciprocate freely without transmitting torque between the rotary elements 22 and 24. To accomplish this purpose, the annular grooves 50, 52 and 54 are in communication with check valves 108, 110, and 112, respectively. Each check valve 108, 110, and 112 is normally in a closed position when the torque transmitting mechanism is in its first position. If the valves 108, 110 and 112 are moved to an open position, as shown with respect to check valve 108 in FIG. 2, the annular groove 50 will be in direct communication with the reservoir 82, for example, and the hydraulic fluid can flow freely from the annular groove 50 via the passageway 114, FIG. 11, to the relatively short annular groove 116 to the passageway 118 for discharge via the radial passageway 120 to the reservoir 82. The other valves 110 and 112 are similarly in communication with reservoir 82. The check valves 108, 110, and 112 can readily be moved to their open positions if the square rods 122 are moved radially outwardly against the balls of the check valves. When this occurs, fluid can flow freely past the square rods and the torque transmitting mechanism 18 will be in its second position so that torque cannot be transmitted in any significant amount from the first rotary member 14 to the second rotary member 26, and therefore the front wheels of the motor vehicle will be in a free wheeling relationship with respect to the rear wheel drive system.

To open the check valves 108, 110, and 112 to their open positions so that the torque transmitting mechanism 18 is in its second position, the actuator means 20 is employed. The actuating means 20 includes the housing 124, which is mounted in a suitable manner on the end of the torque transmitting mechanism 18. Mounted within the housing 124 is an actuator assembly 126 that has an actuator shaft 128 extending axially into the torque transmitting mechanism 18. The assembly 126 is shown in FIG. 2 in its extended position so that the radially outermost surface 130 of the actuator shaft 128 engages the radially innermost ends of the square rods 122 so as to open the three check valves 108, 110 and 112. When the assembly 26 is moved to its retracted position, not shown, the actuator shaft will be moved a corresponding distance to the right, as viewed with respect to FIG. 2, and the radially inner ends of the rods 122 will then rest on the radially inner surface 132 of the actuator shaft 128. When in these positions, the check valves 108, 110 and 112 will be biased to their closed positions. Thus, when the actuator shaft 128 is in its extended position, the torque transmitting mechanism 18 will be in its second or two wheel drive position, and when the actuator shaft is in its retracted position, the torque transmitting mechanism 18 will be in its first or four wheel drive position.

When in either its extended or retracted position, the actuator shaft 128 will rotate with the first rotary element 22 of the torque transmitting mechanism 18, and therefore, the assembly 126 includes the thrust bearing 134 which couples the actuator shaft 128 to the actuator piston 136 while securing the two elements together for axial movement. In its preferred form the actuator means 20 is actuated hydraulically from a remote location whereby when the actuator piston 136 is in its advanced position shown in FIG. 2, the actuator shaft will be in its advanced position, and when the actuator piston 136 is in its retracted position to the extreme right of the cylinder 138, the actuator shaft 128 will be in its retracted position.

A selector lock 140 is provided for locking the assembly 126 in its extended position. The selector lock includes the bushing 142 which has an annular groove 144 formed therein. Three balls 146, only one of which is shown, fit into the annular groove 144 and are retained in a fixed axial position relative to the actuator piston 136 by slots formed in the wall of the piston 136. To maintain the balls 140 in their locked positions, a drive piston 148 is provided which, as shown in FIG. 2, has a two stepped outer cylindrical surface, whereby when the drive piston is in its advanced position as shown, the balls 146 will be locked in place. However, if the drive piston 148 is moved to the right relative to the actuator piston 136 so that the drive piston 148 engages the retainer ring 150, the balls 146 can descend to the smaller outer radius of the piston 148, and the actuator piston 136 can then be moved to its extreme right position.

To retract the assembly 126, hydraulic apparatus is employed in the preferred embodiment of the invention, and for this purpose, hydraulic fluid under pressure will enter at port 152 for flow into the chamber 154 for initially moving the drive piston 148 to the right, allowing the selector lock 140 to release the actuator piston 136 which will then also be moved to the right by the fluid under pressure supplied via port 152 and chamber 154. When this occurs, the cylinder 138 will be substantially at atmospheric pressure. When it is desired to actuate the assembly 126 to the left, the hydraulic pressure in chamber 154 will be relieved by valve means to be described, and hydraulic fluid under pressure will be introduced through a passage 156 against the end of actuator piston 136, initially moving actuator piston 136 to the position shown in FIG. 2, after which the drive piston 148 will also move to the left causing balls 140 to be locked in place again in the groove 144 so as to lock the assembly 126 in place.

The valve means 157 for controlling the flow of hydraulic fluid to actuate the assembly 126 will now be described. The valve means 157 is remotely operated by a push-pull cable 158 which has its remote end located adjacent to the driver of the vehicle for operation purposes. The cable 158 can be reciprocated axially and also can be turned radially. Connected by pin 159 to the near end of push-pull cable 158 for movement therewith is a spool 160. The latter extends lengthwise through the sleeve 162 and is supported at opposite ends of movement by the fittings 164 and 166. A ball 168 is retained in the hole 170 in sleeve 162 and can travel only in the U-shaped groove 172. Thus, the push-pull cable 158 can move the spool 160 axially only when one or the other of the axial legs of the U-shaped groove 172 is in radial alignment with the stationary hole 170 in sleeve 162. Likewise, the push-pull cable 158 can turn the spool 160 radially only when the spool is in its farthest position to the right, as viewed in FIG. 15.

Figures 3, 4, 5:
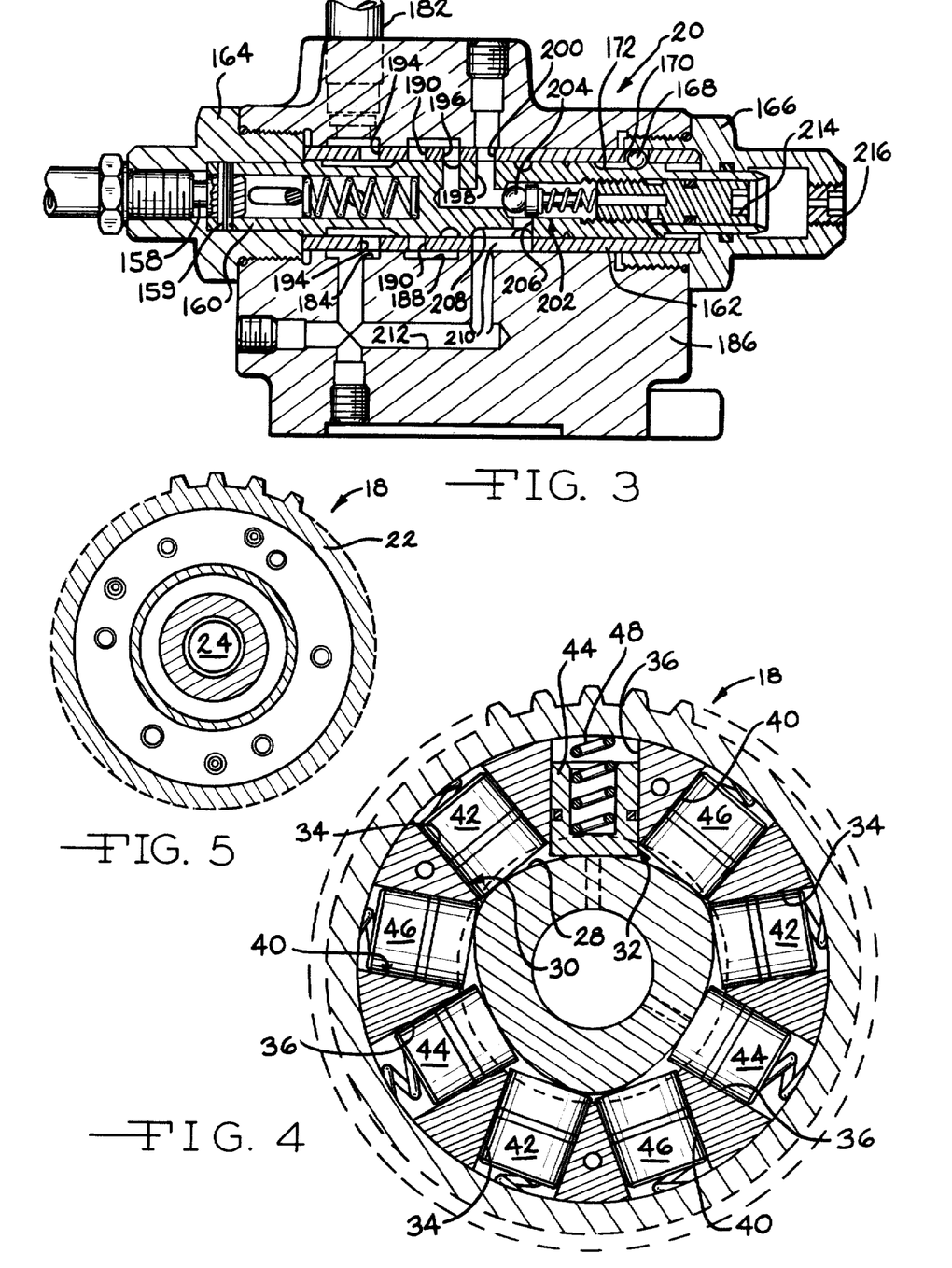
FIG. 3 is a horizontal section of the actuator means taken on the lines 3—3 of FIG. 1, showing details of the valve means.
FIG. 4 is an enlarged vertical section taken essentially on the lines 4—4 of FIG. 2, with portions being axially offset for illustration purposes.
FIG. 5 is a vertical end elevational view of an internal portion of the torque transmitting mechanism, drawn to a reduced scale, as viewed from the lines 5—5 of FIG. 2.
Figure 15:
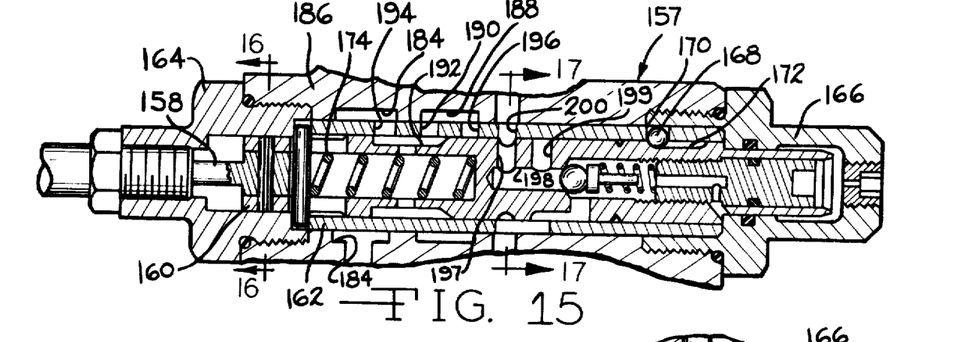
FIG. 15 is a fragmentary section of the valve means similar to the illustration in FIG. 3, but showing the valve means in a different position of operation.
Figure 16:
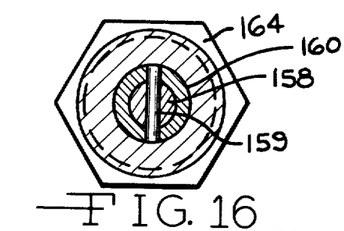
FIGS. 16 and 17 are transverse sectional views taken respectively on the lines 16—16 and 17—17 of FIG. 15.
Figure 17:
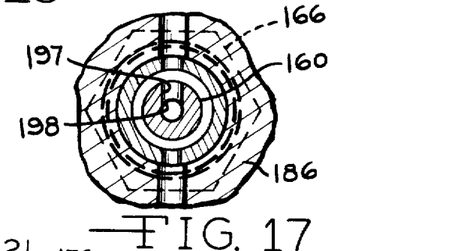
Figure 18:
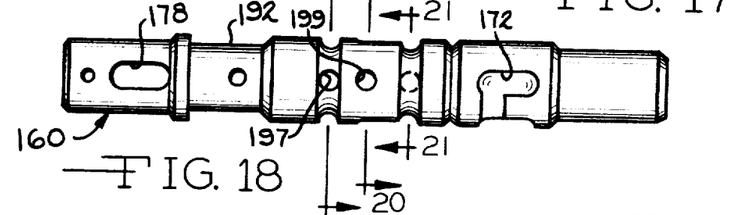
FIG. 18 is a side elevational view of the spool of the valve means shown in FIG. 15.
Figure 19:
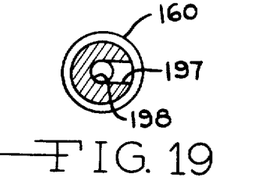
FIGS. 19, 20 and 21 are transverse sections taken on the lines 19, 20 and 21, respectively, of FIG. 18.
Figure 20:
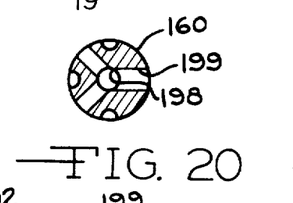
Figure 21:
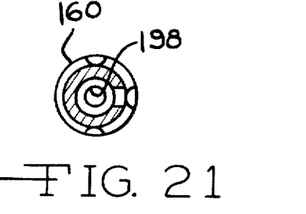
Figure 22:
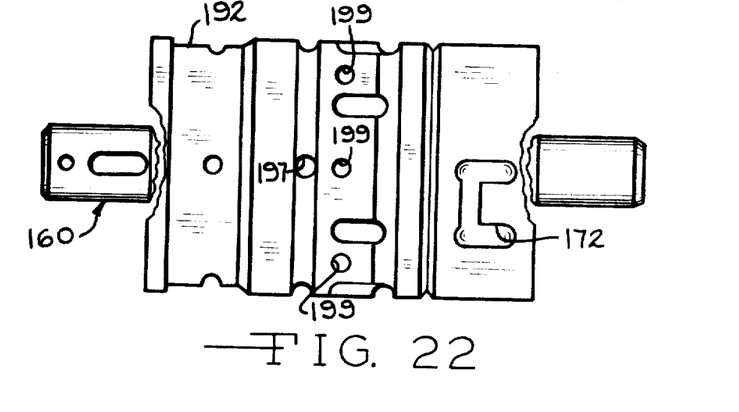
FIG. 22 is a developed view of the spool shown in FIG. 18.
Figure 23:
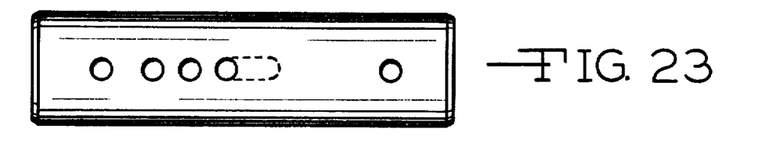
FIG. 23 is a side elevational view of the sleeve that surrounds the spool in FIG. 15.
Figures 24, 25:
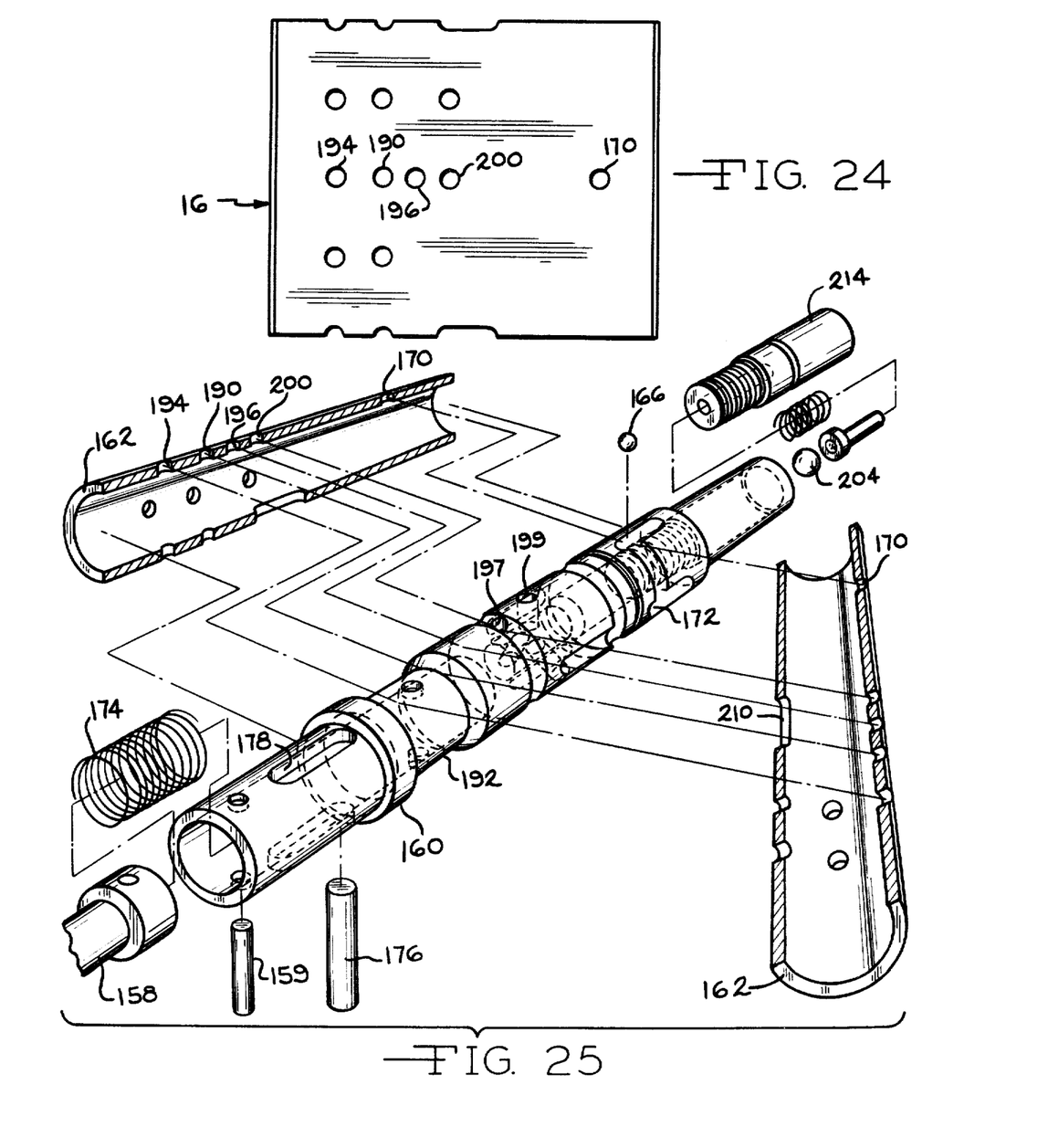
FIG. 24 is a developed view of the sleeve illustrated in FIG. 23.
FIG. 25 is an exploded perspective view of portions of the valve means of FIG. 15.

As will be explained hereafter, fluid under pressure cannot be transmitted to the actuator assembly 126 when the spool 158 is in the position to the right shown in FIG. 15, and it can be supplied to assembly 126 only when the spool 158 is advanced fully to the left, as shown in FIG. 3, and when advanced to the left with the ball 168 in one leg of the U-shaped groove 172, the fluid under pressure will be directed to port 152 for urging the assembly 126 in one direction and when advanced to the left with the ball 168 in the other leg of the U-shaped groove 172, the fluid under pressure will be directed to port 156 for urging the assembly 126 in the other direction.

Normally, the spring 174, which is in a state of compression between spool 160 and fitting 164, will bias the spool to the right so that no fluid under pressure can flow to the actuator assembly 126 until cable 158 is manually actuated to pull the spool to its left position. Spring 174 is retained in place by pin 176 which extends through slot 178 in spool 160 and then is fixed against axial displacement by adjacent ends of fitting 164 and sleeve 170.

Figure 1:
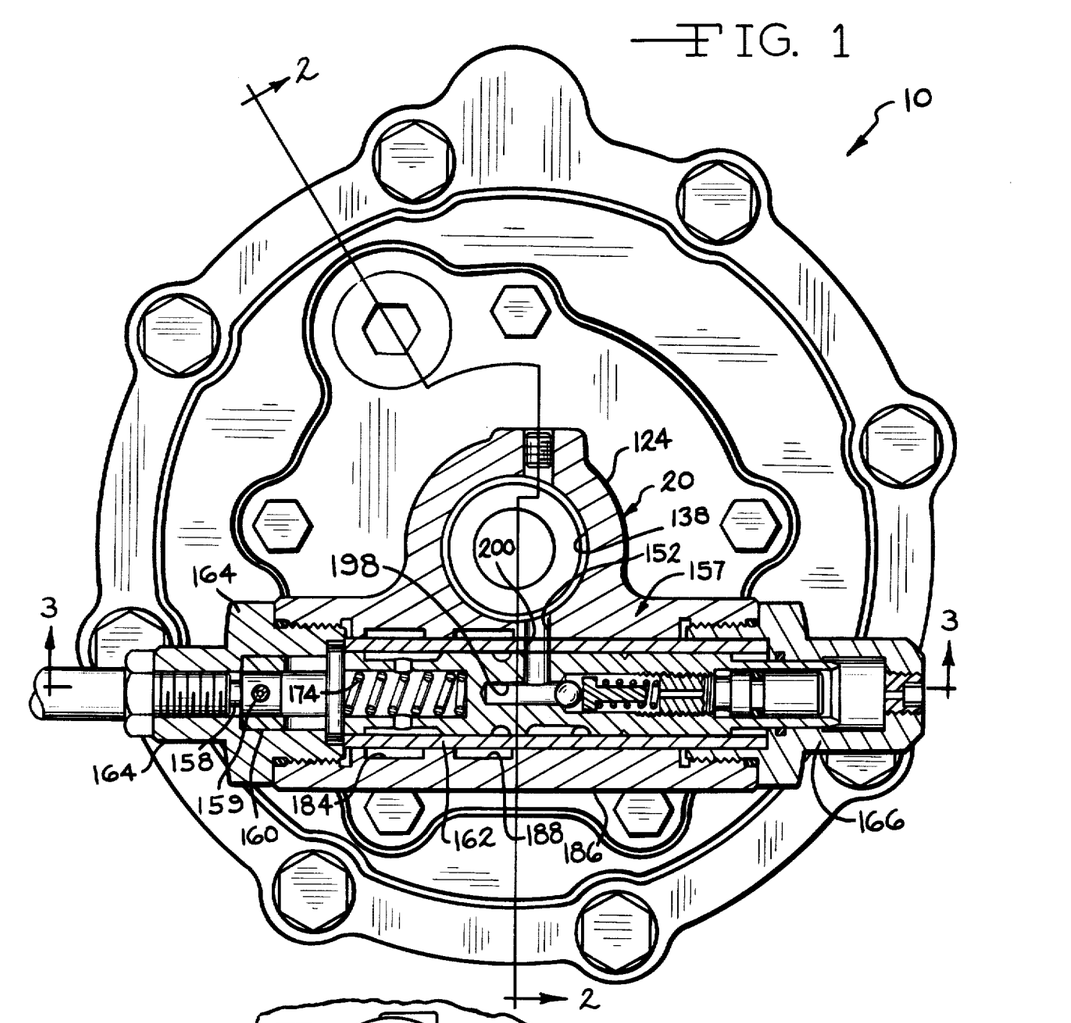
FIG. 1 is an end elevational view of apparatus embodying the present invention, the actuator means being shown in vertical section.
Figure 1A:
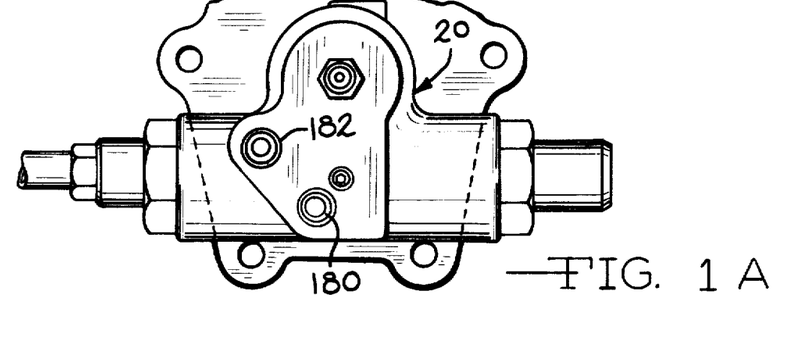
FIG. 1A is a fragmentary end elevational view in reduced scale of the actuator means.

Hydraulic fluid for use with the actuator means 20 can be supplied from any hydraulic fluid system of the vehicle, and will be introduced at inlet fitting 180, FIG. 1A, and the return low pressure fluid will be returned to the hydraulic fluid system from outlet fitting 182.

The outlet fitting 182 is in communication with the annular groove 184 in valve body 186, and the high pressure or inlet fitting 180 is in communication with the annular groove 188. Thus, when the spool 160 is in the position shown in FIG. 15, the fluid under pressure will be directed through annular groove 188, port 190 in sleeve 162, groove 192 in spool 160, port 194 in sleeve 162, annular groove 184 for return to tank. Under these circumstances, the hydraulic fluid will have no effect upon actuator assembly 126.

When it is desired to apply hydraulic pressure to the actuator assembly 126 to move the assembly 126 to its extended position to provide only a two wheel drive, the push-pull cable 158 will be pulled so as to slide the spool 160 to the left to the position shown in FIGS. 1 and 3, and the pressurized hydraulic fluid will then be directed from the annular groove 188, through port 196 in sleeve 162, the passageways 197, 198 and 199 in spool 160, port 200, and out port 152, FIG. 1, to the cylinder 138 for moving actuator piston 136 to the left in FIG. 2.

When it is desired to apply hydraulic pressure to the actuator assembly 126 to move the assembly to its retracted position to provide a four wheel drive, the push-pull cable 158 must first be turned radially and then be pulled so as to slide the spool 160 to the left position. The spool 160 will now be in a different radial position so that the pressurized fluid in passageways 197, 198, 199 will be directed to port 152 and into chamber 154 of the actuator assembly 126, thereby returning the latter to the four wheel drive position, as previously described.

The valve means 157 is provided with a presssure relief valve 202 which has a ball 204 that is spring actuated to its closed position, but when open, will allow pressurized hydraulic fluid to discharge from passage 198 via port 206, groove 208, slot 210 and passageway 212 to tank. The pressure relief valve 202 can be set to open at a selected overload pressure by adjusting the setting of screw 214 when the screw 216 is removed.

It is claimed:

1. In an inter-axle transmission having a rotary input member and a rotary output member, apparatus comprising a torque transmitting mechanism operatively connected between said input member and said output member, said torque transmitting mechanism being connected between said members for actuation to a first position of operation for transmitting substantially no torque from said input member to said output member and wherein substantially free-wheeling of the output member relative to the input member can occur and to a second position of operation for transmitting torque from said input member to said output member and wherein a limited slippage of the output member relative to the input member can occur, and an actuator means associated with said torque transmitting mechanism and actuable to place said torque transmitting mechanism selectively in either said first position or said second position, said actuator means including an assembly hydraulically actuable to move to a retracted position or to an extended position to maintain said torque transmitting mechanism in its first or its second position, valve means for directing hydraulic fluid under pressure to said assembly for moving said assembly either to said retracted position or to said extended position, and a remote control means for actuating said valve means for directing the hydraulic fluid to the assembly for moving said assembly to the selected position, said remote control means being a push-pull cable, and said valve means includes a movable spool to which said cable is connected to enable the spool to be moved from a remote location, said spool being rotatable about its axis to two separate positions for directing fluid to move said assembly respectively either to its retracted position or to its extended position, said spool also being movable axially in one direction to enable fluid under pressure to be directed to said assembly and movable axially in the other direction to block fluid pressure to said assembly.

2. The apparatus that is defined in claim 1, wherein said spool is spring biased in said other direction.

3. The apparatus that is defined in claim 2, wherein said valve means includes spool retention and control means for restraining rotation of said spool except when said spool is spring-biased to its end position of movement in said other direction, and for restraining axial movement of said spool except when said spool is in one or the other of said two separate positions.

4. In an inter-axle transmission having a rotary input member and a rotary output member, apparatus comprising a torque transmitting mechanism operatively connected between said input member and said output member, said torque transmitting mechanism being connected between said members for actuation to a first position of operation for transmitting substantially no torque from said input member to said output member and wherein substantially free-wheeling of the output member relative to the input member can occur and to a second position of operation for transmitting torque from said input member to said output member and wherein a limited slippage of the output member relative to the input member can occur, and an actuator means associated with said torque transmitting mechanism and actuable to place said torque transmitting mechanism selectively in either said first position or said second position, said torque transmitting mechanism including a first rotary element for connection to said input member for rotation therewith, a second rotary element for connection to said output member for rotation therewith, and hydraulic means having a hydraulic circuit, said hydraulic means coupling said rotary elements together for co-rotation while said circuit is closed and allowing substantially free rotation of said second rotary element relative to said first rotary element when said circuit is fully open, and torque control means responsive to pressure in said hydraulic circuit for allowing limited flow of hydraulic fluid in said circuit when the pressure exceeds a preselected magnitude so as to allow limited slippage of said second rotary element relative to said first rotary element, said actuator means being associated with said torque transmitting mechanism for opening and closing said hydraulic circuit to place the torque transmitting mechanism in either its first position or its second position, said hydraulic circuit including at least one passageway in which a normally closed valve is located for closing said hydraulic circuit, and said actuator means including an assembly hydraulically actuable to move to an extended position to open said normally closed valve for maintaining the torque transmission mechanism in its second position, said assembly being hydraulically actuable to move to a retracted position to allow said normally closed valve to close so that said torque transmission mechanism is in its first position.

5. In an inter-axle transmission having a rotary input member and a rotary output member, apparatus comprising a torque transmitting mechanism operatively connected between said input member and said output member, said torque transmitting mechanism being connected between said members for actuation to a first position of operation for transmitting substantially no torque from said input member to said output member and wherein substantially free-wheeling of the output member relative to the input member can occur and to a second position of operation for transmitting torque from said input member to said output member and wherein a limited slippage of the output member relative to the input member can occur, and an actuator means associated with said torque transmitting mechanism and actuable to place said torque transmitting mechanism selectively in either said first position or said second position, wherein said actuator means includes an assembly hydraulically actuable to move to a retracted position or to an extended position to maintain said torque transmitting mechanism in its first or its second position.

6. The apparatus that is defined in claim 5, wherein said assembly comprises an actuator shaft in engagement with said torque transmitting mechanism and movable axially in one direction to a retracted position to maintain said mechanism in its first position and movable axially in the other direction to an extended position to maintain said mechanism in its second position, and an actuator piston coupled to said actuator shaft for axial movement therewith, and valve means in association with said assembly for directing hydraulic fluid under pressure to one end of said piston for moving said piston and said actuator shaft to the extended position of said actuator shaft.

7. The apparatus that is defined in claim 6, wherein said assembly includes a selector lock for locking said actuator piston and said actuator shaft in said extended position and responsive to hydraulic fluid operatively applied under pressure to the other end of said piston for unlocking said selector lock and thereby to release said actuator piston and said actuator shaft for movement to said retracted position, said valve means being operable for directing hydraulic fluid under pressure operatively against the other end of said piston to move said piston and said actuator shaft to the retracted position of said actuator shaft.

8. The apparatus that is defined in claim 5, wherein said actuator means includes valve means for directing hydraulic fluid under pressure to said assembly for moving said assembly either to said retracted position or to said extended position, and a remote control means for actuating said valve means for directing the hydraulic fluid to the assembly for moving said assembly to the selected position.

9. The apparatus that is defined in claim 8, wherein said valve means includes an adjustable pressure relief valve for setting the maximum pressure of the hydraulic fluid that can be directed to said assembly.

10. In an inter-axle transmission having a rotary input member and a rotary output member, apparatus comprising a torque transmitting mechanism operatively connected between said input member and said output member, said torque transmitting mechanism being connected between said members for actuation to a first position of operation for transmitting substantially no torque from said input member to said output member and wherein substantially free-wheeling of the output member relative to the input member can occur and to a second position of operation for transmitting torque from said input member to said output member and wherein a limited slippage of the output member relative to the input member can occur, and an actuator means associated with said torque transmitting mechanism and actuable to place said torque transmitting mechanism selectively in either said first position or said second position, said torque transmitting mechanism including a first rotary element for connection to said input member for rotation therewith, a second rotary element for connection to said output member for rotation therewith, and hydraulic means having a hydraulic circuit, said hydraulic means coupling said rotary elements together for co-rotation while said circuit is closed and allowing substantially free rotation of said second rotary element relative to said first rotary element when said circuit is fully open, and torque control means responsive to pressure in said hydraulic circuit for allowing limited flow of hydraulic fluid in said circuit when the pressure exceeds a preselected magnitude so as to allow limited slippage of said second rotary element relative to said first rotary element, said actuator means being associated with said torque transmitting mechanism for opening and closing said hydraulic circuit to place the torque transmitting mechanism in either its first position or its second position, said hydraulic circuit including at least one passageway in which a check valve is located for closing said hydraulic circuit, and said actuator means including an actuator shaft extending into said torque transmitting mechanism, said actuator shaft being displaceable to an extended position for opening said check valve for maintaining the torque transmission mechanism in its second position, and said actuator shaft being displaceable to a retracted position so that said check valve can close for maintaining the torque transmission mechanism in its first position.

* * * * *